March 17, 1959 F. WOHLMAN 2,877,603

OBJECT JOINING AND SEALING DEVICE

Filed April 1, 1955 3 Sheets-Sheet 1

FRED WOHLMAN,
INVENTOR.

BY Henry Heyman

ATTORNEY

March 17, 1959 F. WOHLMAN 2,877,603

OBJECT JOINING AND SEALING DEVICE

Filed April 1, 1955 3 Sheets-Sheet 2

FRED WOHLMAN,
INVENTOR.

BY Henry Heyman

ATTORNEY

March 17, 1959 F. WOHLMAN 2,877,603

OBJECT JOINING AND SEALING DEVICE

Filed April 1, 1955 3 Sheets-Sheet 3

FRED WOHLMAN, INVENTOR.

BY Henry Heyman

ATTORNEY

United States Patent Office 2,877,603 Patented Mar. 17, 1959

2,877,603

OBJECT JOINING AND SEALING DEVICE

Fred Wohlman, Inglewood, Calif., assignor to Hughes Aircraft Company, Culver City, Calif., a corporation of Delaware Application April 1, 1955, Serial No. 498,664

3 Claims. (Cl. 49—1)

The present invention relates generally to a joining and sealing device and relates more particularly to a mechanism for effecting the joining, sealing and fusing of components of partially assembled semiconductor translating devices.

In the manufacture of semiconductor translating devices such as, for example, transistors of various types, diodes or rectifiers, photocell devices and the like, it is important that all of the various components thereof be assembled in a precise manner, inasmuch as relatively small parts of such devices must accurately be positioned in order that the resulting electrical value of the ultimate finished product may be maintained at a high degree of accuracy. Additionally, most contemporary semiconductor translating devices employ various components that are preferably encased in a hermetically sealed supporting and surrounding structure, in order that the function thereof may properly be maintained. In assembling the necessarily relatively small components in semiconductor translating devices, inasmuch as extreme accuracy must always be present, precise positioning and alignment of various portions of the encasing structure must be maintained, together with specific time controlled electrically heated fusing cycles.

In prior like structures, serious difficulties have been presented relative to the maintaining of proper alignment of various components of semi-conductor translating devices and relative to holding the manufacture thereof within close tolerance limits. Additionally, in order that mass production may constantly be maintained, it is important that consideration be given to the accessible nature of a joining and sealing device, in light of the necessity for manual placement of relatively small items, such as frangible glass elements, in operating positions in the device. Such prior arrangements have been manually difficult to operate and slow in operating characteristics, have failed to consider the requirements of an operator, and have, additionally, failed to maintain the necessary and required precise tolerance limits in mass production situations.

Through use of the device of the present invention, it is important that components, of the semiconductor translating devices that are assembled by means of the present mechanism, be accurately and precisely manufactured prior to assembly hereby, in order that the resulting partially assembled semiconductor translating device may be as accurate and precise as possible. Throughout the following description, therefore, it must be understood that components assembled through use of the present device arrive at this assembly point in an accurate and precise condition.

Accordingly, it is one important object of the present invention to provide a novel device for joining objects and sealing one object with respect to another.

It is another important object of the present invention to provide a novel glass element joining and sealing device having means for accurately positioning the various glass elements, for aligning such elements with each other and for effecting the fusing of one element with another.

It is a further important object of the present invention to provide a device for joining a glass bead carried by a lead with a glass tube and for fusing the bead and tube together providing a hermetically sealed joint therebetween.

It is still another important object of the present invention to provide a joining and sealing device of the class described, wherein novel means are employed for supporting and aligning elements to be joined in a manner permitting rapid and efficient manual operation of the device.

It is a still further important object of the present invention to provide a machine for joining glass elements and sealing one element with respect to another, wherein novel means are employed, in connection with an electrically heated fusing device, for providing an accurately timed heating cycle and for subsequent resetting of the mechanism for a next cycle.

Other and further important objects of the present invention will become apparent from the disclosures in the following detailed specification, appended claims and accompanying drawings, wherein:

Figure 1:
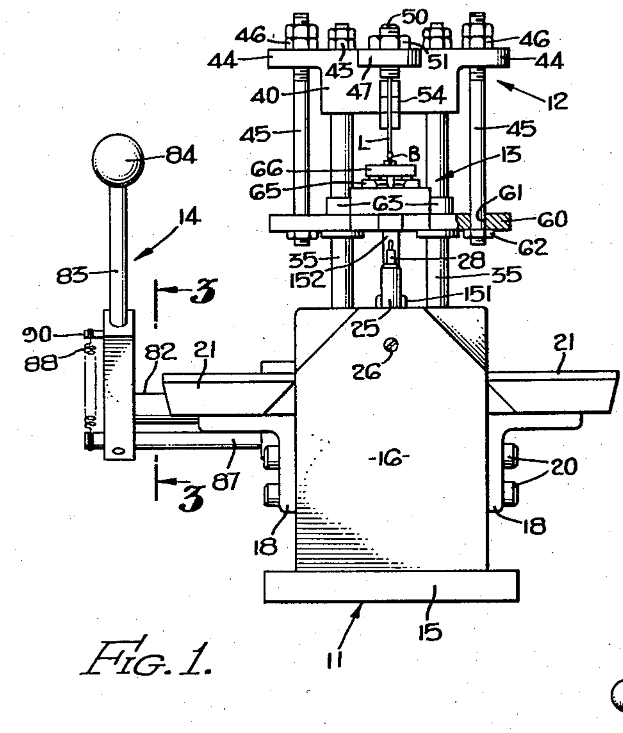
Figure 1 is a front elevational view of the present joining and sealing device.

With reference to the drawings, the device of the present invention includes generally the base structure 11, a lead support 12, a heating element and carriage assembly 13 and a manual operating mechanism 14. As shown primarily in Figs. 1, 2 and 5, the base structure 11 includes a platform 15 that is adapted to rest upon a suitable surface. A base body portion 16 is secured to the platform 15 as by screws 17, the lateral sides of the body 16 having disposed thereon a pair of brackets 18 which are secured thereto by means of screws 20. The upper portions of the brackets 18 serve to support tables 21 which are secured thereto by means of screws 22. The upper surfaces of the tables 21 serve as stations where components to be assembled may be placed so as to be within easy reach and access to an operator of the device.

The base body 16 further includes a vertical bore 23, the upper end of which is reduced in diameter as at 24. A first support structure in the form of a vertically disposed rod 25 is adapted for disposition in the portion 24 of the bore 23, the rod 25 being locked with respect to a vertical position thereof by means of a set screw 26 engageable in a groove 27 in the rod 25. A support fitting 28 is threadably disposed in the upper end of the rod 25, this fitting being provided with a vertically extending reduced diameter tip 30, and having a shoulder 31 defined between the tip 30 and the body of the fitting 28.

The base body 16 is further provided with a rearwardly directed recess 32, there being a pair of aligned bores 33 communicating with the inner end of the recess 32. The bores 33 are fitted with sleeve bearings 34 in which a pair of vertically disposed guide rods 35 are reciprocally positioned.

The lead support 12, which may also be termed a second support for purpose of description, includes a generally transversely disposed body 40 that is provided with a pair of vertically extending bores 41 in which reduced diameter portions 42 of the guide rods 35 are positioned. The body 40 is retained on the guide rods 35 by means of nuts 43 which threadably engage the upper ends of the reduced diameter portions 42 thereof. The body 40 is provided with laterally disposed integral wing portions 44 through which a pair of vertically disposed lifting rods 45 extend. The upper ends of the lifting rods 45 are fitted with nuts 46, the purpose of which will be later described. The upper surface of the lead support body 40 is fitted with a forwardly and rearwardly disposed cross member 47 that is secured in position by means of a screw 48. One of the outwardly extending ends of the member 47 is fitted with a vertically disposed stop member 50 that is locked in position by means of a nut 51. Likewise, the other of the outwardly extending ends of the member 47 is fitted with a vertically disposed stop member 52 that is also locked in position by means of a nut 53. The forward surface of the body 40 serves to support a generally U-shaped permanent magnet 54 that is retained in position by means of a screw 55. The permanent magnet 54 has vertically disposed grooves 56 in the faces thereof, the purpose of which will be later described.

The lower ends of the lifting rods 45 serve to support a carriage 60 of the heating element and carriage assembly 13. The lifting rods 45 are slidably positioned in vertically disposed bores 61 of the carriage 60 with the lower surface of the carriage 60 being adapted to rest upon nuts 62 which threadably engage the lower ends of the rods 45. A pair of sleeve bearings 63 are carried by the carriage 60 and adapted to surround the guide rods 35, thus vertically to reciprocally guide the carriage 60. The upper surface of the carriage 60 is adapted to support an insulating element 64 and a pair of insulating jaw members 65 which are secured to the carriage by means of a transverse bar 66, Figs. 6 and 7, and screws 67. The insulating member 64 is retained on the carriage 60 by means of screws 68. The jaws 65 serve to support a coiled heating element 70 the peripheral area of which is shielded by means of a cup 71, having an open upper end and a bore 72 in the lower surface therof. The cup 71 is mounted on the forward face of the carriage 60.

Figure 3:
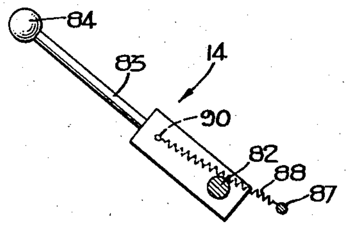
Fig. 3 is a fragmentary view, partially in section, showing the operating lever of the present device, as taken substantially as indicated by line 3—3, Fig. 1.
Figure 4:
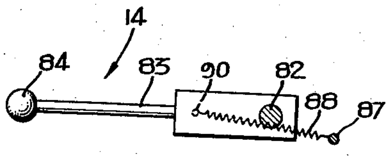
Fig. 4 is a view similar to Fig. 3 with parts in different positions.

In order manually to move the various components of the present device, a bracket 80 is mounted on the rearward portion of the base body 16 and secured thereto by means of screws 81. A shaft 82 is transversely disposed with respect to the base body 16 and journalled in the bracket 80. One outer end of the shaft 82 has a lever 83 secured thereto, there being a handle 84 on the outer end of the lever. An angular member 85 is mounted on a rearward portion of the bracket 80 and secured thereto by means of screws 86. The angular member 85 serves to support a laterally extending rod 87, there being a tension spring 88 disposed between the outer end of the rod 87 and a pin 90 carried by the lever 83. With reference to Figs. 3 and 4, it is to be noted that the arrangement of the rod 87, spring 88 and pin 90 is such, with respect to the shaft 82, that the spring 88 will act as an overcenter latching device in order to urge the lever 83 in either an upward or a downward position, as desired. The central portion of the shaft 82 serves to support a crank arm 91 that is secured thereto by means of a tapered pin 92. The outer end of the arm 91 is forked, as at 93, for reception of a pin 94 that is carried by, and disposed laterally outwardly from, one of the guide rods 35. It may thus be seen that upon movement of the lever 83 from one or the other of the positions shown in Figs. 3 and 4, the crank arm 91 will be moved, whereby vertically to cause reciprocal movement of the guide rods 35 and various mechanisms carried thereby.

Figure 2:
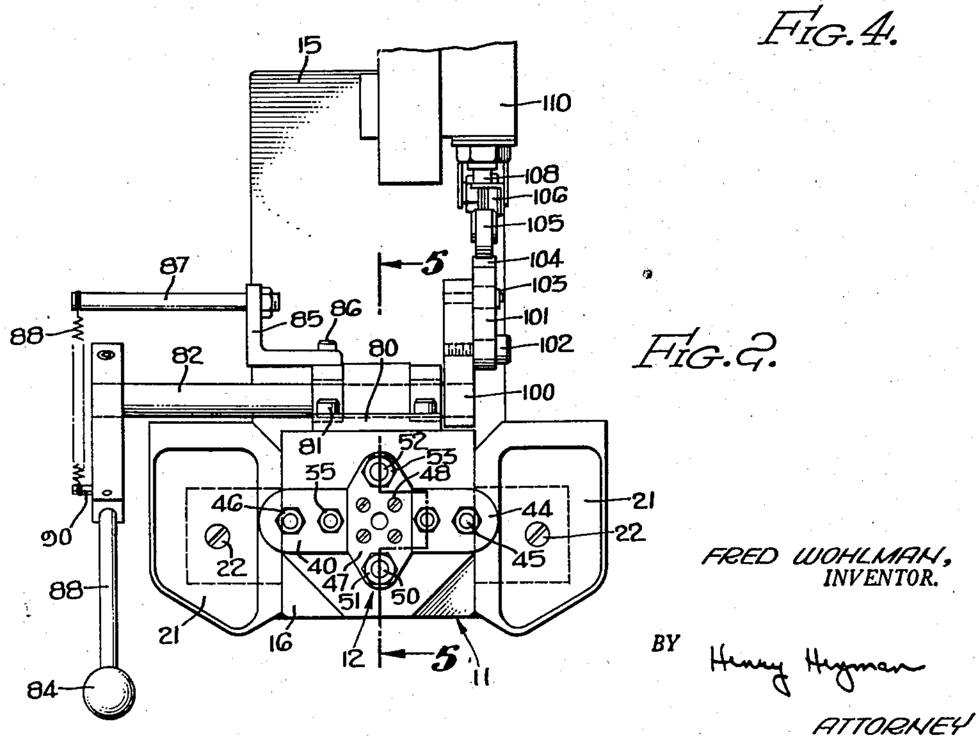
Fig. 2 is a top plan view of the device.

With reference primarily to Fig. 2, the end of the shaft 82 remote from the lever 83 is fitted with an arm 100, on which a switch operating lever 101 is pivotally mounted, as by a screw 102. The lever 101 is limited in its downward movement by means of a stop 103 carried by the arm 100, and is suitably inclined as at 104 on the outer end thereof. The outer end 104 of the lever 101 is adapted for cooperation and engagement with a roller 105 carried by a lever 106 which is, in turn, pivoted as at 107 to the base platform 15. The lever 106 is adapted for cooperation with an operating member 108 of a switch 110, the switch 110 being mounted on the platform 15. The particular arrangement of the lever 100, roller 105 and switch 110 is shown diagrammatically in Fig. 8.

Figures 6, 7, 8:
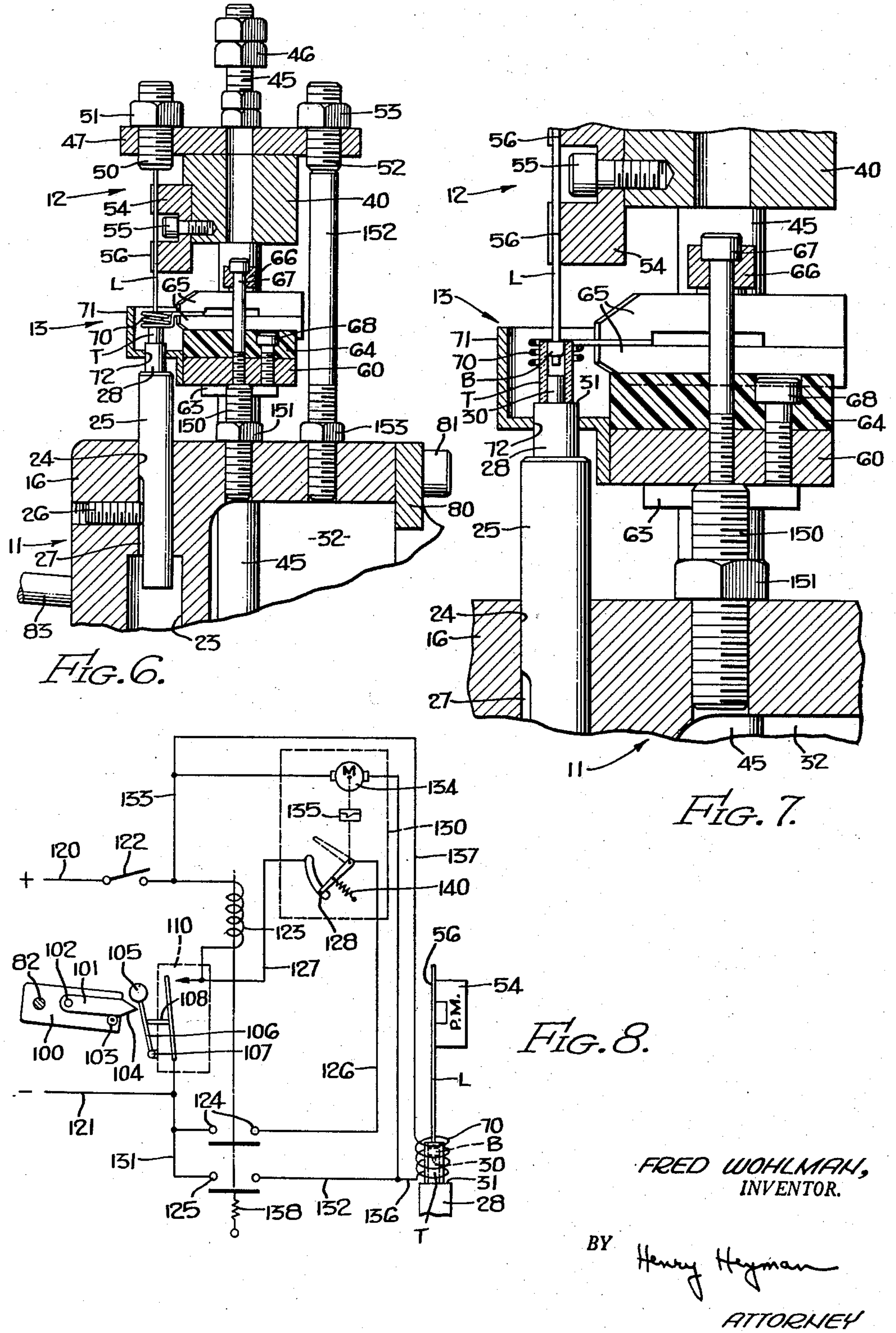
Fig. 6 is a fragmentary sectional view similar to portions of Fig. 5 with parts in different positions.
Fig. 7 is a further enlarged fragmentary sectional view showing details of the present joining and sealing device with parts in the position shown in Fig. 6.
Fig. 8 is a diagrammatic wiring diagram showing a typical electrical system that may be employed with the present joining and sealing device.

With reference primarily to Fig. 8, the device of the present invention is utilized with a suitable electrical circuit to insure a proper timed heating cycle for the coiled heating element 70. By way of example, electrical energy for operation of the support is provided through leads 120 and 121 and a master switch 122. Upon momentary closure of the switch 110, a coil 123 of a relay will be energized, thus to close two pairs of contacts 124 and 125. The contacts 124 maintain a closed circuit across the switch 110 by means of leads 126 and 127 which are, in turn, connected to a sliding contact 128 of a timer mechanism 130. Thus, the coil 123 of the relay will be held in an energized condition even though only momentary closure of the switch 110 is accomplished. Contacts 125 serve also, through leads 131, 132 and 133, to energize a motor 134, in the timer mechanism 130, which is adapted to drive the sliding contact 128, through a suitable clutch mechanism 135. The contacts 125 also serve, through leads 136 and 137, to energize the coiled heating element 70. When the motor 134 drives the movable contact 128 to the position shown by the dotted lines, the holding circuit, defined by the contacts 124 and leads 126 and 127 for the relay coil 123, will be opened whereby to permit de-energization of the coil 123 and opening of the contacts 124 and 125. The contacts 124 and 125 are biased toward an open position by means of a tension spring 138. Upon de-energization of the motor 134, the timer mechanism will be reset by means of a tension spring 140, connected to the movable contact 128, preparatory to the next heating cycle. It is to be noted that the lever 100 will move the roller 105 in a direction to close the switch 110 only when the lever 83 is moved from the position shown in Fig. 3 to the position shown in Fig. 4. When the lever 83 is moved from the position shown in Fig. 4 to the position shown in Fig. 3, the lever 101 will merely pivot about the screw 102 and bypass the roller 105.

In operation of the present device, a glass tube or sleeve T is manually placed upon the tip 30 of the fitting 28 and against the shoulder 31. Thereafter, a lead L, having a bead B fused thereon, is positioned in the grooves 56 of the permanent magnet 54 with the vertical position of the lead being determined by abutment of the uppermost end thereof against the lower face of the stop member 50. Thereafter, the lever 83 is moved from the position shown in Fig. 3 to the position shown in Fig. 4 whereby to move the guide rods 35 in a downward direction and permit disposition of the carriage 60 in the position shown in Figs. 6 and 7 with the heating element 70 being disposed about the upper end of the tube T. Downward travel of the carriage 60 is limited by means of an adjustable stop member 150 that is threadably disposed in the upper surface of the base body 16 and retained in position by means of a lock nut 151, thus accurately to dispose the coiled heating element 70 in a precise position about the upper end of the tube T. It is to be noted that the guide rods 35 accurately vertically align the lead L and bead B in a coextensive manner with both the coils of the heating element 70 and the tube T supported on the fitting 28. Upon continued downward movement of the lever 83, the lifting rods 45 will slide through the bores 61 in the carriage 60 and the lead support 12 will be moved downwardly to the position shown in Figs. 6 and 7, whereby to dispose the bead B in the upper end of the tube T. Downward movement of the lead support 12 is limited by means of a vertically disposed limit member 152 that is threadably disposed in the upper surface of the base body 16 and is locked in position by means of a lock nut 153. The upper end of the limit member 152 is adapted for engagement with a lower surface of the adjustable stop member 52 carried by the body 40 of the lead support 12. Thus, the bead B is accurately positioned within the upper end of the tube T. As described hereinbefore, upon movement of the lever 83, and positioning of the heating coil 70 about the upper end of the tube T, the electrical timing cycle will be initiated by operation of the switch 110.

Figure 5:
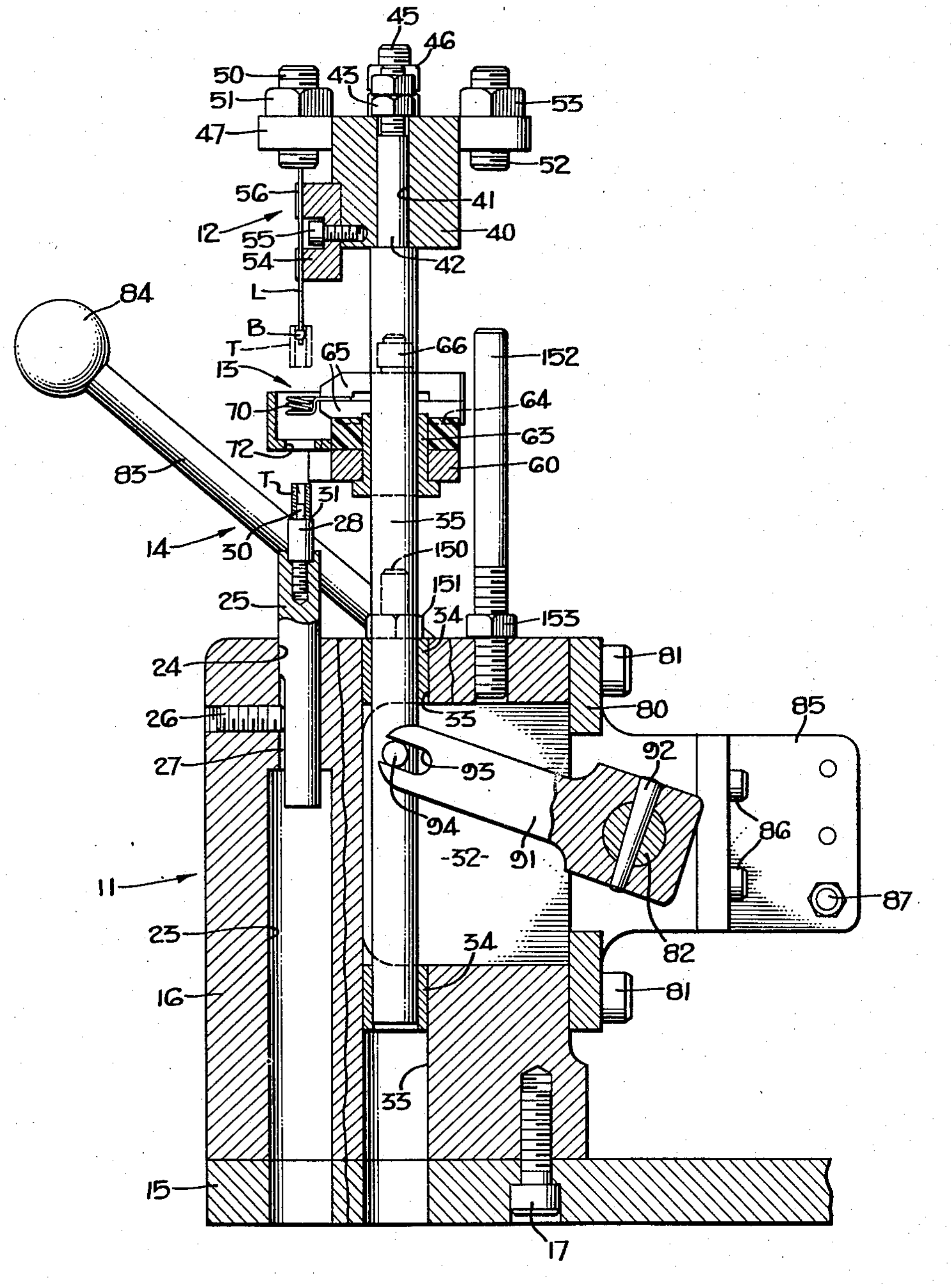
Fig. 5 is an enlarged transverse sectional view through the present joining and sealing device, as taken substantially as indicated by line 5—5, Fig. 2.

Upon completion of the timed heating cycle, the lever 83 is again moved to the position shown in Fig. 3 and the lead L will be withdrawn to the position shown in Fig. 5 with the tube T (shown in dotted lines in Fig. 5) being withdrawn from the tip 30 and now supported on and fused to the bead B. The lead L, together with the bead B and tube T, may thereafter manually be removed from the permanent magnet 54 and new leads and tubes positioned for the next assembly procedure.

It is to be noted that, by employing a movable heating element, the various supporting structures for the components of the partially assembled semiconductor translating device will be readily accessible for insertion in and placement in position on the present device. Thus, it is unnecessary for an operator dangerously to place hands in positions close enough to the hot heating coil 70 so as to incur burns or other injuries. Additionally, the operator's hands are protected by means of the cup 71 surrounding the heated coil 70, passage of the fitting 28 into the opening 72 in the lower portion of the cup 71 and occlusion of the opening 72 thereby, serves also to confine the heat supplied by the heating coil 70 to an area immediately surrounding the glass elements to be fused.

It is also to be noted that the present device is provided with multiple adjustments, whereby to permit use with a variety of sizes of leads, beads and tubes, in order that accurate assembly of these components may be accomplished on a single machine.

Having thus described the invention and the present embodiment thereof, it is desired to emphasize the fact that many modifications may be resorted to in a manner limited only by a just interpretation of the following claims.

I claim:

1. A device for joining a glass bead carried by a lead with a glass tube and for fusing said bead and said tube comprising, in combination: a base structure; a cylindrical support carried by said base structure and disposed vertically upwardly therefrom, said cylindrical support being adapted for reception of said tube; a pair of guide rods vertically reciprocally positioned in said base structure and extending upwardly therefrom; a lever operatively connected to said guide rods and journalled in said base structure whereby to permit manual reciprocation of said rods; a lead support secured to upper ends of said rods; a permanent magnet carried by said lead support, said lead being adapted for disposition on said permanent magnet with said bead thereon disposed downwardly therefrom and in spaced alignment with said tube; a heating element; a carriage for said heating element, said carriage being slidably disposed on said guide rods; a pair of lifting rods carried by and disposed downwardly from said lead support, said lifting rods being slidably disposed through said carriage and having enlargements on lower ends thereof, said enlargements being adapted for engagement with a lower surface of said carriage whereby, upon movement of said lever, to permit disposition of said heating element about said tube and thereafter to permit insertion of said bead into one end of said tube; separate means for limiting vertical downward travel of said carriage and said lead support; means responsive to movement of said heating element into position about said tube for energizing said heating element; timer means for limiting a period of energization of said heating element; and means for resetting said timer means following completion of a timed cycle thereof.

2. A device for joining a glass bead carried by a lead with a glass tube and for fusing said bead and said tube comprising, in combination: a base structure; a cylindrical support carried by said base structure and disposed vertically upwardly therefrom, said cylindrical support being adapted for reception of said tube; a pair of guide rods vertically reciprocally positioned in said base structure and extending upwardly therefrom; a lever operatively connected to said guide rods and journalled in said base structure whereby to permit manual reciprocation of said rods; a lead support secured to upper ends of said rods; a permanent magnet carried by said lead support, said lead being adapted for disposition on said permanent magnet with said bead thereon disposed downwardly therefrom and in spaced alignment with said tube; means for limiting vertical upward movement of said lead with respect to said lead support and said permanent magnet; a heating element; a carriage for said heating element, said carriage being slidably disposed on said guide rods; a pair of lifting rods carried by and disposed downwardly from said lead support, said lifting rods being slidably disposed through said carriage and having enlargements on lower ends thereof, said enlargements being adapted for engagement with a lower surface of said carriage whereby, upon movement of said lever, to permit disposition of said heating element about said tube and thereafter to permit insertion of said bead into one end of said tube; separate means for limiting vertical downward travel of said carriage and said lead support; means responsive to movement of said heating element into position about said tube for energizing said heating element; timer means, also energizable in response to said movement of said heating element, for limiting a period of energization of said heating element; and means for resetting said timer means following completion of a timed cycle thereof.

3. A device for joining a glass bead carried by a lead with a glass tube and for fusing said bead and said tube comprising, in combination: a base structure; a cylindrical support carried by said base structure and disposed vertically upwardly therefrom, said cylindrical support being adapted for reception of said tube; a pair of guide rods vertically reciprocally positioned in said base structure and extending upwardly therefrom; a lever having crank means operatively connected to said guide rods and journalled in said base structure whereby to permit manual reciprocation of said rods; overcenter spring means for biasing said lever in positions at extremes of movement thereof; a lead support secured to upper ends of said rods; a permanent magnet carried by said lead support, said lead being adapted for disposition on said permanent magnet and in an alignment groove therein, with said bead thereon disposed downwardly therefrom and in spaced alignment with said tube; means for limiting vertical upward movement of said lead with respect to said lead support and said permanent magnet; a coiled heating element; a carriage for said heating element, said carriage being slidably disposed on said guide rods; a pair of lifting rods carried by and disposed downwardly from said lead support, said lifting rods being slidably disposed through said carriage and having enlargements on lower ends thereof, said enlargements being adapted for engagement with a lower surface of said carriage whereby, upon movement of said lever, to permit disposition of coils of said heating element about said tube and thereafter to permit insertion of said bead into one end of said tube; separate adjustable screw means for limiting vertical downward travel of said carriage and said lead support; means responsive to movement of said coiled heating element into position about said tube for energizing said heating element; motor driven timer means, also energizable in response to said movement of said heating element, for limiting a period of energization of said heating element; and means for de-energizing said motor and said heating element and for resetting said timer means following completion of a timed cycle thereof.

References Cited in the file of this patent

UNITED STATES PATENTS

| | | |
|---|---|---|
| 2,359,501 | White | Oct. 3, 1944 |
| 2,361,517 | White | Oct. 31, 1944 |
| 2,432,491 | Thomas | Dec. 9, 1947 |
| 2,697,307 | Diehl et al. | Dec. 21, 1954 |